(12) United States Patent
Zhang et al.

(10) Patent No.: US 9,239,503 B2
(45) Date of Patent: Jan. 19, 2016

(54) ARRAY SUBSTRATE AND DISPLAY DEVICE INCLUDING PIXEL UNITS WITH MULTIPLE DISPLAY REGIONS

(71) Applicants: BOE TECHNOLOGY GROUP CO., LTD., Beijing (CN); HEFEI BOE OPTOELECTRONICS TECHNOLOGY CO., LTD., Hefei (CN)

(72) Inventors: Xinxia Zhang, Beijing (CN); Zhizhong Tu, Beijing (CN); Xiao Guo, Beijing (CN); Fengzhen Lv, Beijing (CN); Byungcheon Lim, Beijing (CN)

(73) Assignees: BOE Technology Group Co., Ltd., Beijing (CN); HEFEI BOE Optoelectronics Technology Co., Ltd., Hefei (KR)

( * ) Notice: Subject to any disclaimer, the term of this patent is extended or adjusted under 35 U.S.C. 154(b) by 142 days.

(21) Appl. No.: 14/064,521

(22) Filed: Oct. 28, 2013

(65) Prior Publication Data

US 2014/0118652 A1 May 1, 2014

(30) Foreign Application Priority Data

Oct. 30, 2012 (CN) .......................... 2012 1 0424872

(51) Int. Cl.
| | | |
|---|---|---|
| *G02F 1/136* | (2006.01) | |
| *G02F 1/1337* | (2006.01) | |
| *G02F 1/1333* | (2006.01) | |
| *G09G 3/30* | (2006.01) | |
| *G09G 3/36* | (2006.01) | |
| *G02F 1/1368* | (2006.01) | |
| *G02F 1/1343* | (2006.01) | |
| *G02F 1/1362* | (2006.01) | |

(52) U.S. Cl.
CPC .......... *G02F 1/1368* (2013.01); *G02F 1/13624* (2013.01); *G02F 1/134309* (2013.01); *G02F 1/133707* (2013.01); *G02F 2001/134345* (2013.01)

(58) Field of Classification Search
CPC ............ G02F 1/1369; G02F 1/136227; G02F 1/136286; G02F 1/1333; G02F 1/133305; G02F 1/133351; G02F 1/133707; G02F 1/1393; G02F 1/133; G02F 1/753; G09G 2300/0842; G09G 3/3233; G09G 2300/089; G09G 3/3648; G09G 3/3614; G09G 3/3659; H04N 27/1214; H04N 27/22
USPC .......................... 349/43, 158, 129; 345/80, 90
See application file for complete search history.

(56) References Cited

U.S. PATENT DOCUMENTS

| 8,817,211 B2 * | 8/2014 | Sato et al. ..................... 349/129 |
| 2008/0018573 A1 * | 1/2008 | Hsieh et al. ..................... 345/87 |
| 2012/0033149 A1 * | 2/2012 | Song et al. ..................... 349/42 |

FOREIGN PATENT DOCUMENTS

KR    20070109588 A    11/2007

OTHER PUBLICATIONS

First Chinese Office Action issued by the Chinese Patent Office for Chinese Patent Application No. 201210424872.1 dated Aug. 5, 2014, 5pgs.
English translation of First Chinese Office Action issued by the Chinese Patent Office for Chinese Patent Application No. 201210424872.1 dated Aug. 5, 2014, 5pgs.
Apr. 3, 2015—(CN) Second Office Action of Application No. 2012104248721 with Eng Tran.

* cited by examiner

*Primary Examiner* — Mike Qi
(74) *Attorney, Agent, or Firm* — Banner & Witcoff, Ltd.

(57) ABSTRACT

Embodiments of the invention provide an array substrate and a display device. The array substrate comprises a base substrate, a plurality of gate lines and a plurality of data lines formed on the base substrate, and a plurality of pixel units defined by the plurality of gate lines and the plurality of data lines intersecting with each other. Each pixel unit is driven by a same gate line and a same data line. Each pixel unit includes a thin film transistor structure and at least two display regions. Each display region includes a pixel electrode. The thin film transistor structure drives the pixel electrodes in the at least two display regions simultaneously and causes voltages applied on the pixel electrodes in the at least two display regions different from one another.

20 Claims, 5 Drawing Sheets

ARRAY SUBSTRATE AND DISPLAY DEVICE INCLUDING PIXEL UNITS WITH MULTIPLE DISPLAY REGIONS

CROSS REFERENCE TO RELATED APPLICATIONS

This application claims priority from Chinese National Application No., 201210424872.1 filed on Oct. 30, 2012 the contents of which are incorporated herein by reference.

TECHNICAL FIELD

Embodiments of the invention relate to an array substrate and a display device.

BACKGROUND

In recent years, liquid crystal display of advanced super dimensional switching (AD-SDS, ADS for short) mode has been widely applied. In the ADS mode, a multi-dimensional electric field is formed with both an electric field generated at edges of slit electrodes in a same plane and an electric field generated between a slit electrode layer and a plate-like electrode layer, so that liquid crystal molecules at all orientations, which are located directly above the electrodes or between the slit electrodes in a liquid crystal cell, can be rotated, In this way, the work efficiency of liquid crystal can be enhanced and the light transmittance can be increased. The ADS mode can improve the image quality of the thin film transistor liquid crystal display and has advantages of high resolution, high transmittance, low power consumption, wide viewing angle, high aperture ratio, low chromatic aberration, high response speed, free of push Mura, etc.

An array substrate of the ADS mode liquid crystal display comprises two layers of transparent electrodes, i.e. a first transparent electrode and a second transparent electrode disposed above the first transparent electrode. One of the first transparent electrode and the second transparent electrode is used as a pixel electrode and connected to a drain electrode of a thin film transistor, and the other is used as a common electrode and connected to a common electrode line. The second transparent electrode includes stripe electrodes having a certain width and separated from each other at a certain interval, so the second transparent electrode is also called a slit electrode. The second transparent electrode and the first transparent electrode are arranged with one overlapping the other, and the first transparent electrode and the second transparent electrode are separated from each other with an insulating layer.

Figure 1:
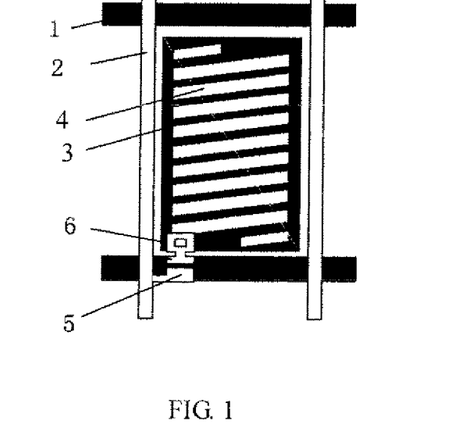
FIG. 1 is a partial schematic diagram illustrating an array substrate of a conventional ADS mode liquid crystal display.
Figure 2:
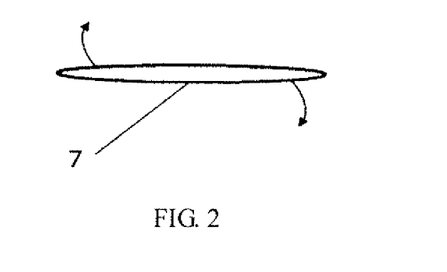
FIG. 2 is a schematic diagram illustrating liquid crystal orientation when the array substrate shown in FIG. 1 is adopted.

FIG. 1 is an array substrate of a conventional ADS mode liquid crystal display. The array substrate comprises gate lines 1, data lines 2, and pixel units defined by the gate lines 1 and data lines 2 intersecting with each other. As shown in FIG. 1, the pixel unit includes a pixel electrode and a thin film transistor. The pixel electrode includes strip electrodes 3, and an opening 4 is provided between adjacent strip electrodes. The thin film transistor includes a gate electrode (not shown), a source electrode 5 and drain electrodes 6. Referring to FIG. 1, the strip electrodes 3 of the pixel electrode all incline in one direction. When the conventional liquid crystal display operates, liquid crystal deflects as driven by the electric field, and the liquid crystal 7 in each pixel unit only has one deflection angle, as shown in FIG. 2. Due to anisotropy of the liquid crystal, the liquid crystal display has differences in brightness when it is viewed from different viewing angles, and has certain chromatic aberration.

Figure 3:
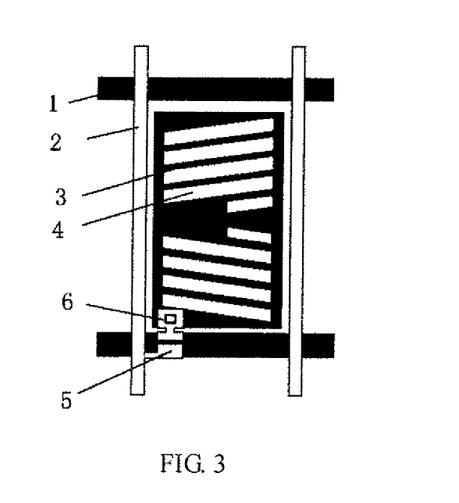
FIG. 3 is a partial schematic diagram illustrating an array substrate of another conventional ADS mode liquid crystal display.
Figure 4:
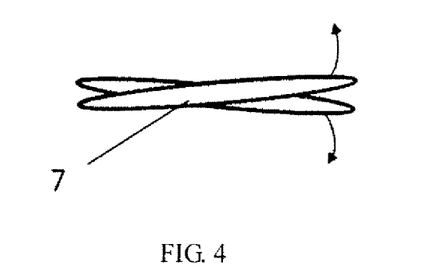
FIG. 4 is a schematic diagram illustrating liquid crystal orientation when the array substrate shown in FIG. 3 is adopted.

FIG. 3 is an array substrate of another conventional ADS mode liquid crystal display. As shown in FIG. 3, the pixel unit has a two-domain display region (the display region of the pixel unit is a region covered by the pixel electrode except for the thin film transistor), that is, the stripe electrodes 3 in each pixel unit have two inclination angles. When the liquid crystal display operates, the liquid crystal deflects as driven by the electric field, and the liquid crystal 7 in each pixel unit has two deflection angles, as shown in FIG. 4. Due to the averaging effect of deflection of the liquid crystal 7, differences in brightness of the liquid crystal display when the liquid crystal display is viewed from different viewing angles decrease, and chromatic aberration is improved in some degree.

However, it is necessary to further reduce the differences in brightness of the liquid crystal display so as to reduce chromatic aberration.

SUMMARY

According to one aspect of the invention, there is provided an array substrate. The array substrate comprises a base substrate, a plurality of gate lines and a plurality of data lines formed on the base substrate, and a plurality of pixel units defined by the plurality of gate lines and the plurality of data lines intersecting with each other. Each pixel unit is driven by a same gate line and a same data line. Each pixel unit includes a thin film transistor structure and at least two display regions. Each display region includes a pixel electrode. The thin film transistor structure drives the pixel electrodes in the at least two display regions simultaneously and causes voltages applied on the pixel electrodes in the at least two display regions different from one another.

For example, the pixel unit includes two display regions disposed respectively on two sides of the gate line for driving the pixel unit.

For example, the thin film transistor structure is a composite thin film transistor, the composite thin film transistor includes a gate electrode, a common source electrode, two drain electrodes, and two channels formed respectively between the common source electrode and the two drain electrodes; the gate electrode is connected to the gate line for driving the pixel unit; the common source electrode is connected to the data line for driving the pixel unit; the two drain electrodes are connected respectively to the pixel electrodes in the two display regions; and the two channels formed respectively between the common source electrode and the two drain electrodes are different from each other in channel width.

For example, the gate electrode is a single common gate electrode.

For example, the gate electrode includes two separate gate electrodes.

For example, each of the two channels has the channel width of 20~30 μm.

For example, the thin film transistor structure includes two thin film transistors; gate electrodes of the two thin film transistors both are connected to the gate line for driving the pixel unit; source electrodes of the two thin film transistors both are connected to the data line for driving the pixel unit; drain electrodes of the two thin film transistors are connected respectively to the pixel electrodes in the two display regions; and a channel between the source electrode and the drain electrode of one of the two thin film transistors is different from a channel between the source electrode and the drain electrode of the other of the two thin film transistors in channel width.

For example, the channel of each of the two thin film transistors has the channel width of 20~30 μm.

For example, each display region includes a common electrode and the pixel electrode, the pixel electrode and the common electrode are separated from each other by an insulating layer. The pixel electrode is disposed above the common electrode and the pixel electrode includes strip electrodes, or, the common electrode is disposed above the pixel electrode and the common electrode includes strip electrodes.

For example, the strip electrodes of each display region include a first group of strip electrodes and a second group of strip electrodes; the strip electrodes in the first group of strip electrodes are parallel to one another, and the strip electrodes in the second group of strip electrodes are parallel to one another; an inclination direction of the strip electrodes in the first group of strip electrodes is different from an inclination direction of the stripe electrodes in the second group of strip electrodes; and the first group of strip electrodes and the second group of strip electrodes are arranged symmetrically in each display region.

For example, when a liquid crystal in the display region is a positive liquid crystal, an included angle between an inclination direction of the strip electrodes and an initial orientation direction of the positive liquid crystal is 5°~20°; or when the liquid crystal in the display region is a negative liquid crystal, an included angle between the inclination direction of the strip electrodes and an initial orientation direction of the negative liquid crystal is 70°~85°.

For example, an area ratio of the two display regions is 1:1~1:9.

For example, the area ratio of the two display regions is 1:1.

For example, the thin film transistor structure is provided on the left side of the pixel unit.

For example, the thin film transistor structure is provided on the right side of the pixel unit.

For example, the pixel unit includes two display regions disposed respectively on two sides of the data line for driving the pixel unit.

For example, the pixel unit includes three display regions disposed on a same side of the data line for driving the pixel unit and on a same side of the gate line for driving the pixel unit.

For example, the pixel unit includes four display regions disposed respectively in four regions defined by the data line for driving the pixel unit and the gate line for driving the pixel unit intersecting with each other.

According to another aspect of the invention, there is provided a display device. The display device comprises an array substrate as described above.

BRIEF DESCRIPTION OF THE DRAWINGS

In order to clearly illustrate the technical solution of the embodiments of the invention, a brief introduction of the drawings of the embodiments shall be given hereinafter, apparently, the drawings described as follows only relate to some embodiments of the invention, but do not limit the invention.

DETAILED DESCRIPTION

In order to make the object, technical solution and advantages of the embodiments of the invention clearer, the technical solution in the embodiments of the invention shall be clearly and completely described hereinafter in conjunction with the accompanying drawings. Obviously, the described embodiments are part of rather than all of the embodiments of the invention. Based on the embodiments of the invention, all the other embodiments that a person ordinarily skilled in the art obtains without inventive effort are within the scope of the invention.

Embodiment 1

Figure 5:
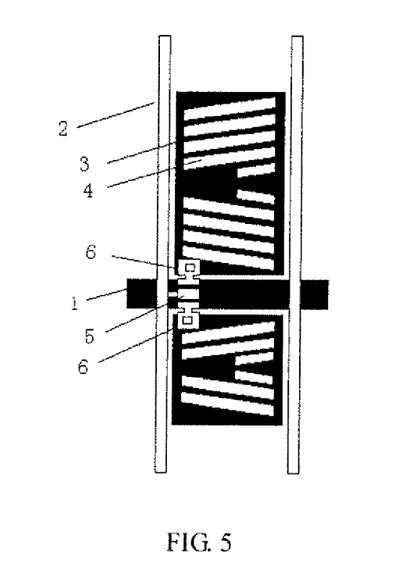
FIG. 5 is a partial schematic diagram illustrating an array substrate according to Embodiment 1 of the invention.

As shown in FIG. 5, an array substrate according to the present embodiment comprises: a base substrate, a plurality of gate lines 1 and a plurality of data lines 2 formed on the base substrate, and a plurality of pixel units defined by the plurality of gate lines 1 and the plurality of data lines 2 intersecting with each other. As an example, FIG. 5 merely shows one pixel unit. Each pixel unit is driven by a same gate line 1 and a same data line 2, and each pixel unit includes a thin film transistor structure and two display regions. Each display region includes a pixel electrode. The thin film transistor structure drives the pixel electrodes in the two display regions simultaneously, and causes voltages applied on the pixel electrodes in the two display regions different from each other.

For example, as shown in FIG. 5, the two display regions are disposed respectively on two sides of the gate line 1 for driving the pixel unit.

In this embodiment, the thin film transistor structure is a composite thin film transistor and comprises: a gate electrode (not shown in the drawings), a common source electrode 5, two drain electrodes 6, and two channels formed respectively between the common source electrode 5 and the two drain electrodes 6. The gate electrode is connected to the gate line 1, the common source electrode 5 is connected to the data line 2, the two drain electrodes 6 are connected respectively to the pixel electrodes in the two display regions, and the two channels formed respectively between the common source electrode 5 and the two drain electrodes 6 are different from each other in channel width.

For example, each of the two channels has the channel width of 20~30 μm.

It should be noted that the gate electrode of the composite thin film transistor may be a single common gate electrode, or may be two separate gate electrodes, only if the gate electrode is connected to the gate line 1.

As described above, each display region includes the pixel electrode. In addition, each display region further includes a common electrode. The pixel electrode and the common electrode are separated from each other by an insulating layer. The pixel electrode may be disposed above the common electrode or below the common electrode. The upper one among the pixel electrode and the common electrode includes stripe electrodes, and the lower one among the pixel electrode and the common electrode may include strip electrodes or may be a plate electrode. For example, in this embodiment, the pixel electrode is disposed above the common electrode and includes strip electrodes 3, and an opening 4 is provided between adjacent strip electrodes 3.

In the present embodiment, each display region is a two-domain display region. In other words, in each display region, the strip electrodes 3 of the pixel electrode include a first group of strip electrodes and a second group of strip electrodes. The strip electrodes in the first group of strip electrodes are parallel to one another, and the strip electrodes in the second group of strip electrodes are parallel to one another. An inclination direction of the strip electrodes in the first group of strip electrodes is different from an inclination direction of the stripe electrodes in the second group of strip electrodes, and the first group of strip electrodes and the second group of strip electrodes are arranged symmetrically in each display region.

Figure 6:
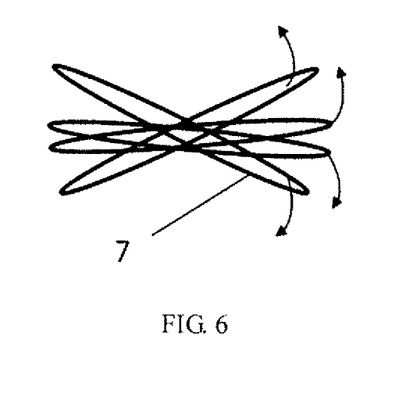
FIG. 6 is a schematic diagram illustrating liquid crystal orientation when the array substrate shown in FIG. 5 is adopted.

Since each display region is designed into the two-domain display region, the liquid crystal in each display region has two deflection directions as driven by voltage. In addition, since two channels of the composite thin film transistor are different in channel width, voltages applied on the pixel electrodes in the two display regions connected to the same data line 2 are different, and the deflection angles of the liquid crystal in the two display regions are different as well. In this way, the liquid crystal 7 in one pixel unit has four deflection angles, as shown in FIG. 6. Therefore, in different viewing angles, the anisotropy of the liquid crystal can be better averaged, and the chromatic aberration is further reduced.

For example, when the liquid crystal in the display region is a positive liquid crystal, an included angle between the inclination direction of the strip electrodes of the pixel electrode and an initial orientation direction of the positive liquid crystal is 5°~20°; when the liquid crystal in the display region is a negative liquid crystal, the included angle between the inclination direction of the strip electrodes of the pixel electrode and the initial orientation direction of the negative liquid crystal is 70°~85°.

For example, an area ratio of the two display regions is 1:1~1:9. In order to better reduce the chromatic aberration and obtain a better display effect, the area ratio of the two display regions is preferably 1:1.

Embodiment 2

Figure 7:
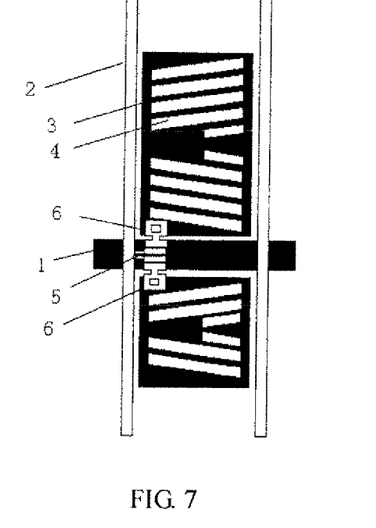
FIG. 7 is a partial schematic diagram illustrating an array substrate according to Embodiment 2 of the invention.

The array substrate according to this embodiment is shown in FIG. 7, and the structure thereof is substantially same as that of the array substrate in Embodiment 1. The array substrate according to this embodiment is different from the array substrate in Embodiment 1 in that this embodiment adopts two separate thin film transistors (each thin film transistor includes a gate electrode, a source electrode, and a drain electrode) to replace the composite thin film transistor in Embodiment 1. The gate electrodes of the two thin film transistors are both connected to the same gate line 1, the source electrodes 5 of the two thin film transistors are both connected to the same data line 2, and the drain electrodes 6 of the two thin film transistors are connected respectively to the pixel electrodes 3 in the two display regions. A channel between the source electrode 5 and the drain electrode 6 of one of the two thin film transistors is different from a channel between the source electrode 5 and the drain electrode 6 of the other of the two thin film transistors in channel width.

For example, each of the channels of the two thin film transistors has the channel width of 20~30 μm.

The remaining part of the array substrate in this embodiment is the same as that in Embodiment 1, and this embodiment can achieve the same improvement of chromatic aberration as Embodiment 1.

Modified Embodiments

The structure of the array substrate is not limited to the above two embodiments, and any variations of the above two embodiments are also within the protection scope of the invention.

Figure 8:
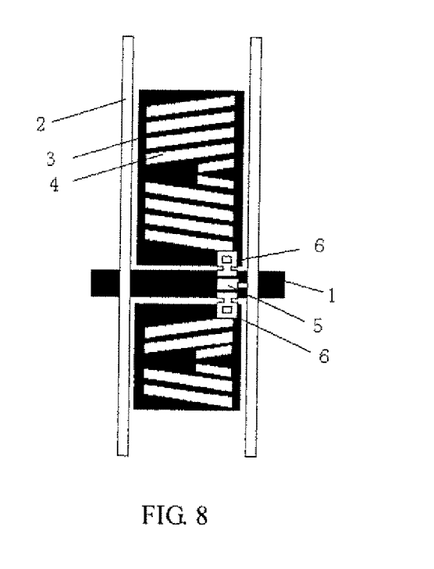
FIG. 8 is a partial schematic diagram illustrating an array substrate according to an modified embodiment of the invention.

For example, the position of the composite thin film transistor may be different from the position of the composite thin film transistor in Embodiment 1. In Embodiment 1 shown in FIG. 5, the composite thin film transistor is disposed at the left data line for defining the pixel unit. However, the composite thin film transistor may be disposed at the right data line for defining the pixel unit, as shown in FIG. 8. In addition, in FIG. 8, the strip electrodes 3 are arranged in the same way as in Embodiment 1.

Figure 9:
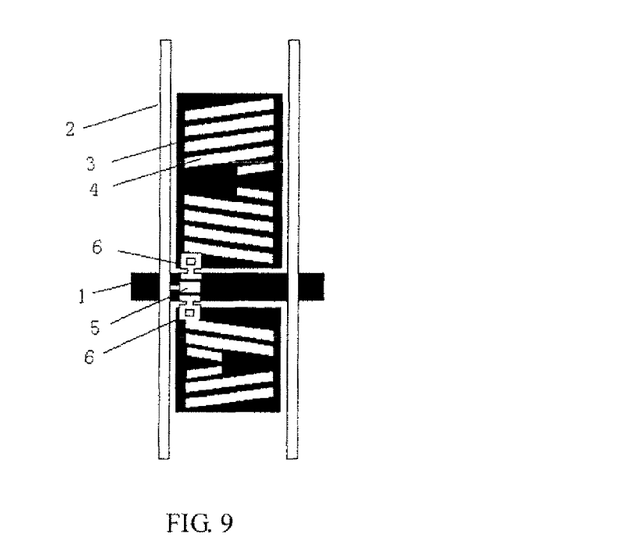
FIG. 9 is a partial schematic diagram illustrating an array substrate according to another modified embodiment of the invention.

For example, the arrangement manner of the strip electrodes 3 in each display region may be changed. In Embodiment 1 shown in FIG. 5, the strip electrodes 3 in the display region above the gate line 1 are arranged in the same way as the strip electrodes 3 in the display region below the gate line 1. However, in FIG. 9, the strip electrodes 3 in the two display regions are arranged in different ways. As shown in FIG. 9, the stripe electrodes 3 of the upper group of strip electrodes in the display region above the gate line 1 have the inclination direction same as the strip electrodes 3 of the lower group of strip electrodes in the display region below the gate line 1; the stripe electrodes 3 of the lower group of strip electrodes in the display region above the gate line 1 have the inclination direction same as the strip electrodes 3 of the upper group of strip electrodes in the display region below the gate line 1.

It should be noted that the array substrates in FIGS. 8 and 9 can obtain the same advantageous effects as the array substrates in Embodiment 1 and Embodiment 2.

In Embodiment 1, Embodiment 2 and Modified embodiments shown in FIGS. 8-9, the two display regions are disposed respectively on two sides of the gate line 1 for driving the pixel unit. However, the two display regions may be disposed respectively on two sides of the data line 2 for driving the pixel unit.

In the above embodiments, each pixel unit includes two display regions, and the liquid crystal in each pixel unit has four deflection angles. In order to make the liquid crystal have more deflection angles and further reduce the chromatic aberration, the number of the display regions of each pixel unit may be larger than two, for example, the number of the display regions of each pixel unit may be three, four or more.

In this case, multiple separate thin film transistors which are different in channel width may be adopted to drive the display regions respectively. The pixel unit including three display regions and the pixel unit including four display regions are shown in FIG. 10 and FIG. 11 respectively.

Figure 10:
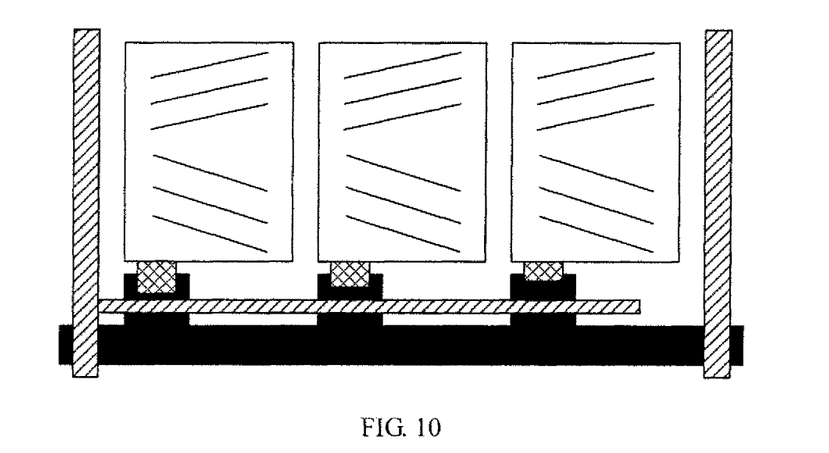
FIG. 10 is a partial schematic diagram illustrating an array substrate according to yet another modified embodiment of the invention, wherein each pixel unit has three display regions.

For example, the pixel unit includes three display regions disposed on a same side of the data line for driving the pixel unit and on a same side of the gate line for driving the pixel unit, as shown in FIG. 10.

Figure 11:
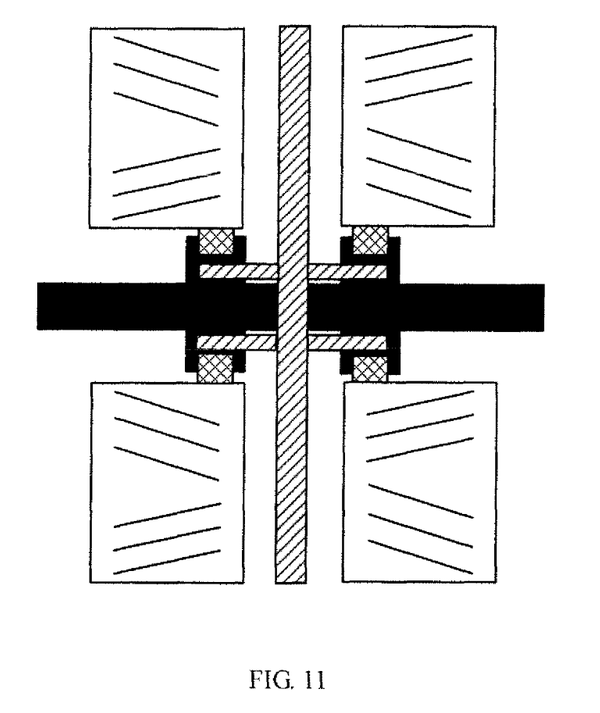
FIG. 11 is a partial schematic diagram illustrating an array substrate according to still yet another modified embodiment of the invention, wherein each pixel unit has four display regions.

For example, the pixel unit includes four display regions disposed respectively in four regions defined by the data line for driving the pixel unit and the gate line for driving the pixel unit intersecting with each other, as shown in FIG. 11.

In the case that the pixel unit includes three display regions, it is preferably that the array substrate having such pixel unit is applied to a widescreen display device. In the case that the pixel unit includes four display regions, the thin film transistor structure may adopt the composite thin film transistor with different channel widths, or may adopt a plurality of separate thin film transistors with different channel widths.

If the pixel unit has much more display regions, the liquid crystal in the pixel unit has n×2 deflection angles (n is the number of the display regions in the pixel unit), so that the anisotropy of the liquid crystal can be better averaged and the chromatic aberration can be further reduced.

The more the display regions are, the more complex the fabrication process is, so the preferred number of the display regions is 2, 3 or 4.

Embodiment 3

This embodiment provides a display device, comprising an array substrate in any one of the above embodiments. The display device may be LCD panel, LCD TV, LCD monitor, digital photo frame, mobile phone, pad, or any other product or component having a display function.

The foregoing embodiments merely are exemplary embodiments of the invention, and not intended to define the scope of the invention, and the scope of the invention is determined by the appended claims.

What is claimed is:

1. An array substrate, comprising a base substrate, a plurality of gate lines and a plurality of data lines formed on the base substrate, and a plurality of pixel units defined by the plurality of gate lines and the plurality of data lines intersecting with each other, wherein:
    each pixel unit is driven by a same gate line and a same data line;
    each pixel unit includes a thin film transistor structure and at least two display regions, each display region includes a pixel electrode, the thin film transistor structure drives the pixel electrodes in the at least two display regions simultaneously and causes voltages applied on the pixel electrodes in the at least two display regions different from one another;
    the thin film transistor structure is a composite thin film transistor that includes a gate electrode, a common source electrode, two drain electrodes, and two channels formed respectively between the common source electrode and the two drain electrodes; and
    the two channels formed respectively between the common source electrode and the two drain electrodes are different from each other in channel width.

2. The array substrate according to claim 1, wherein the pixel unit includes two display regions disposed respectively on two sides of the gate line for driving the pixel unit.

3. The array substrate according to claim 2, wherein
    the gate electrode is connected to the gate line for driving the pixel unit;
    the common source electrode is connected to the data line for driving the pixel unit; and
    the two drain electrodes are connected respectively to the pixel electrodes in the two display regions.

4. The array substrate according to claim 3, wherein the gate electrode is a single common gate electrode.

5. The array substrate according to claim 3, wherein the gate electrode includes two separate gate electrodes.

6. The array substrate according to claim 3, wherein each of the two channels has the channel width of 20~30 μm.

7. The array substrate according to claim 2, wherein an area ratio of the two display regions is 1:1~1:9.

8. The array substrate according to claim 7, wherein the area ratio of the two display regions is 1:1.

9. The array substrate according to claim 2, wherein the thin film transistor structure is provided on a left side of the pixel unit.

10. The array substrate according to claim 2, wherein the thin film transistor structure is provided on a right side of the pixel unit.

11. The array substrate according to claim 1, wherein each display region includes a common electrode and the pixel electrode, the pixel electrode and the common electrode are separated from each other by an insulating layer; and
    wherein the pixel electrode is disposed above the common electrode and the pixel electrode includes strip electrodes, or, the common electrode is disposed above the pixel electrode and the common electrode includes strip electrodes.

12. The array substrate according to claim 11, wherein the strip electrodes of each display region include a first group of strip electrodes and a second group of strip electrodes;
    the strip electrodes in the first group of strip electrodes are parallel to one another, and the strip electrodes in the second group of strip electrodes are parallel to one another;
    an inclination direction of the strip electrodes in the first group of strip electrodes is different from an inclination direction of the stripe electrodes in the second group of strip electrodes; and
    the first group of strip electrodes and the second group of strip electrodes are arranged symmetrically in each display region.

13. The array substrate according to claim 11, wherein,
    when a liquid crystal in the display region is a positive liquid crystal, an included angle between an inclination direction of the strip electrodes and an initial orientation direction of the positive liquid crystal is 5°~20°; or
    when the liquid crystal in the display region is a negative liquid crystal, an included angle between the inclination direction of the strip electrodes and an initial orientation direction of the negative liquid crystal is 70°~85°.

14. The array substrate according to claim 1, wherein the pixel unit includes two display regions disposed respectively on two sides of the data line for driving the pixel unit.

15. The array substrate according to claim 1, wherein the pixel unit includes three display regions disposed on a same side of the data line for driving the pixel unit and on a same side of the gate line for driving the pixel unit.

16. The array substrate according to claim 1, wherein the pixel unit includes four display regions disposed respectively in four regions defined by the data line for driving the pixel unit and the gate line for driving the pixel unit intersecting with each other.

17. A display device, comprising the array substrate according to claim 1.

18. An array substrate, comprising a base substrate, a plurality of gate lines and a plurality of data lines formed on the base substrate, and a plurality of pixel units defined by the plurality of gate lines and the plurality of data lines intersecting with each other, wherein:
- each pixel unit is driven by a same gate line and a same data line;
- each pixel unit includes a thin film transistor structure and at least two display regions, each display region includes a pixel electrode, the thin film transistor structure drives the pixel electrodes in the at least two display regions simultaneously and causes voltages applied on the pixel electrodes in the at least two display regions different from one another;
- the thin film transistor structure includes two thin film transistors; and
- a first channel formed between a source electrode and a drain electrode of a first one of the two thin film transistors is different from a second channel formed between a source electrode and a drain electrode of a second one of the two thin film transistors in channel width.

19. The array substrate according to claim 18, wherein:
gate electrodes of the two thin film transistors both are connected to the gate line for driving the pixel unit;
source electrodes of the two thin film transistors both are connected to the data line for driving the pixel unit; and
drain electrodes of the two thin film transistors are connected respectively to the pixel electrodes in the two display regions.

20. The array substrate according to claim 18, wherein the channel of each of the two thin film transistors has the channel width of 20~30 μm.

* * * * *